United States Patent
Bauerle et al.

(10) Patent No.: US 8,054,039 B2
(45) Date of Patent: Nov. 8, 2011

(54) SYSTEM AND METHOD FOR CHARGING A PLUG-IN ELECTRIC VEHICLE

(75) Inventors: Paul A. Bauerle, Fenton, MI (US); Vernon L. Newhouse, Farmington, MI (US); Jeffrey T. Wolak, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 445 days.

(21) Appl. No.: 12/340,079

(22) Filed: Dec. 19, 2008

(65) Prior Publication Data

US 2010/0156355 A1    Jun. 24, 2010

(51) Int. Cl.
*H02J 7/14* (2006.01)
*H02J 7/04* (2006.01)

(52) U.S. Cl. ........................ 320/109; 320/162

(58) Field of Classification Search .................. 320/109, 320/145, 132, 152, 157, 158, 159, 162, 163, 320/164; 903/903, 907; 180/65.1, 65.21, 180/65.29
See application file for complete search history.

(56) References Cited

U.S. PATENT DOCUMENTS

| | | | |
|---|---|---|---|
| 6,424,122 B2 * | 7/2002 | Yagi et al. | 320/132 |
| 7,560,902 B2 * | 7/2009 | Unger | 320/141 |
| 2009/0103341 A1 * | 4/2009 | Lee et al. | 363/124 |

OTHER PUBLICATIONS

Xantrex; PROsine 2.0 Inverter/Charger (User's Manual); 146 pages; www.xantrex.com.

* cited by examiner

*Primary Examiner* — Kenneth J Whittington
(74) *Attorney, Agent, or Firm* — Lionel D. Anderson; Reising Ethington P.C.

(57) ABSTRACT

A battery charging system and method for charging a plug-in electric vehicle with power from an external power source, such as a standard 110 volt or 220 volt AC wall outlet. The method senses various internal and external conditions and uses this information to charge the plug-in electric vehicle in an optimum fashion that reduces charging time yet avoids damage to components of the charging system. In one embodiment, the battery charging system includes an external power source, a battery charger with sensors for monitoring the external power source and the charger, a battery unit with sensors for monitoring the battery, a battery charging control module for processing the information, and a user interface that allows user-specified custom charging constraints. All of these components, with the exception of external power source, may be located on the vehicle.

18 Claims, 2 Drawing Sheets

SYSTEM AND METHOD FOR CHARGING A PLUG-IN ELECTRIC VEHICLE

TECHNICAL FIELD

The present invention generally relates to charging batteries and, more particularly, to a system and method that monitors and/or controls charging conditions so that a vehicle battery is charged in an optimum fashion.

BACKGROUND

A plug-in electrical vehicle may require electricity in between vehicle operation in order to charge a rechargeable battery pack. In most applications, a battery charger receives power from a power source such as a 110 v AC outlet, and then rectifies and/or transforms the power to a form and level that is suitable for charging the battery pack that resides on the vehicle. The charging conditions within the system, such as the temperature of the battery charger, the amount of charge on the battery, etc., can affect the charging process.

SUMMARY OF THE INVENTION

According to one embodiment, there is provided a method for charging a plug-in electric vehicle. The method generally comprises the steps of: (a) sensing at least one condition pertaining to an external power source, a battery charger located on the plug-in electric vehicle, or a battery unit located on the plug-in electric vehicle; (b) determining a charging control signal based on the sensed condition; and (c) charging the battery unit with the battery charger, wherein the battery charger is operated according to the charging control signal and the charging control signal is periodically adjusted in response to changes in the sensed condition.

According to another embodiment, there is provided a method for charging a plug-in electric vehicle. The method generally comprises the steps of: (a) sensing one or more condition(s) pertaining to an external power source, a battery charger, and a battery unit; (b) evaluating each of the sensed conditions with a particular battery charging constraint; (c) reviewing each of the evaluations and identifying the most-restrictive constraint, wherein the most-restrictive constraint is the one that requests the least amount of current from the battery charger; and (d) operating the battery charger so that it does not violate the most-restrictive constraint.

According to another embodiment, there is provided a system for charging a plug-in electric vehicle. The system generally comprises: a battery charger that is located on the plug-in electric vehicle and has an input coupled to an external power source, an output coupled to a battery unit, and one or more sensor(s) for monitoring external power source conditions and/or battery charger conditions; a battery unit that is located on the plug-in electric vehicle and has an input coupled to the battery charger and one or sensor(s) for monitoring battery conditions; and a battery charging control module that is located on the plug-in electric vehicle and is coupled to both the battery charger and the battery unit. The battery charging control module receives readings from the battery charger sensor(s) and the battery sensor(s) and uses those readings to control the output power that the battery charger provides the battery unit.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

Figure 1:
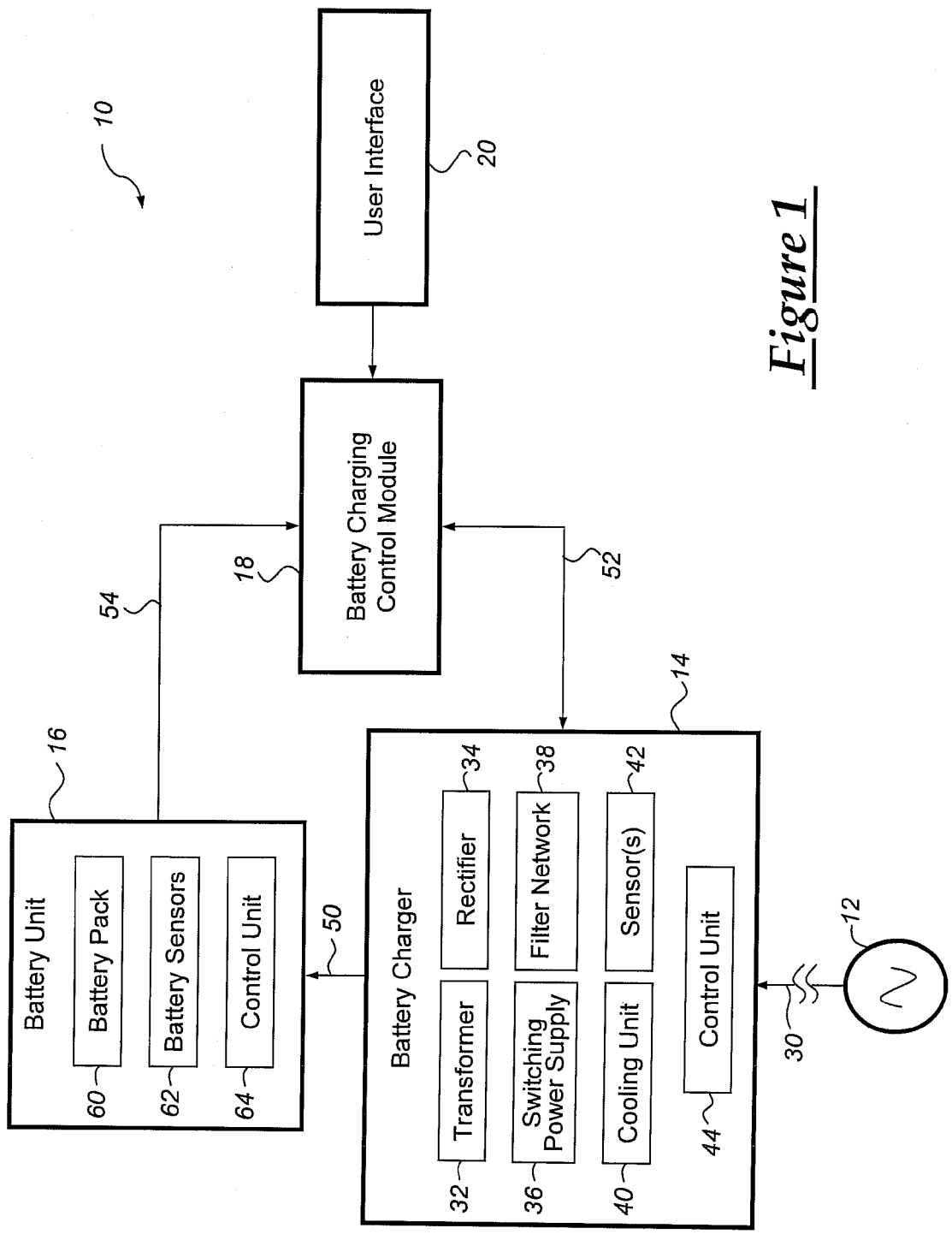
FIG. 1 is a block diagram of an exemplary system for charging a vehicle battery, such as those found on a plug-in electric vehicle.

With reference to FIG. 1, there is shown an exemplary battery charging system 10 for a plug-in electric vehicle that senses various conditions within the system and uses the sensed conditions to charge the vehicle battery in an optimum fashion. Battery charging system 10 attempts to charge the vehicle battery as quickly as possible yet do so in a manner that avoids damage to the components of the charging system; such components can include, for example, the power coupling that a user selects to connect the vehicle to an external power source. Although the following description is provided in the context of a particular battery charging system, it should be appreciated that this system is merely exemplary and that other systems could also be used. For example, the battery charging system and method described below can be used with any type of electric vehicle, including a plug-in hybrid electric vehicle (PHEV) or a battery electrical vehicle (BEV), or any other vehicle where a vehicle battery is charged with an external power source. According to this particular embodiment, battery charging system 10 includes an external power source 12, a battery charger 14, a battery unit 16, a battery charging control module 18, and a user interface 20. All of these components, with the exception of external power source 12, may be fixedly mounted and located on the vehicle.

External power source 12 provides battery charging system 10 with electrical power over a power coupling 30, and may be one of a number of different power supply types known in the art. For example, external power source 12 can be a standard AC power outlet that provides 110 v or 220 v of electricity at 60 Hz, or it can be a portable generator such as the type that runs on natural gas, propane, gasoline, diesel, or the like. In one embodiment, external power source 12 is a renewable power source, such as a remote charging station powered by energy from solar panels, wind turbines, hydro-electric means, biomass, etc. External power source 12 may be connected to battery charger 14 in one of a variety of different ways, including via conductive connections, inductive connections, as well as other connections known in the art. In an exemplary embodiment, power coupling 30 is a specialized vehicle power coupling (such as those described in specifications SAE J-1772 and J-1773), and includes a first end for plugging into a standard AC wall outlet and a second end for plugging into the vehicle. This enables a user to easily plug and unplug the vehicle from a common AC wall outlet, such as those found in most garages. Skilled artisans will appreciate that the system and method described herein are not limited to any particular external power source, as a number of different power source types could be used.

Battery charger 14 is connected to both external power source 12 and battery unit 16, and uses the power from the external power source to charge the battery unit according to charging control signals from battery charging control module 18. According to an exemplary embodiment, battery charger 14 is a programmable charger that is mounted in the vehicle and includes a transformer 32, a rectifier 34, a switching power supply 36, a filter network 38, cooling unit 40, one or more sensors 42, a control unit 44, and any other suitable components known in the art.

Depending on the particular arrangement, transformer 32 steps-up and/or steps-down the input voltage from external power source 12 to a different and, in some cases, programmable output voltage. Rectifier 34 rectifies the AC signal into a DC signal and includes a half-wave, full-wave or other type of known rectifying arrangement. Switching power supply 36 takes the rectified signal and, according to one embodiment, rapidly switches a power transistor or other switch between saturation ('on') and cutoff ('off') according to a variable duty cycle whose average corresponds to the desired output voltage. In this way, switching power supply 36 is able to control the amount of current, and hence power, that is provided by battery charger 14 to battery unit 16. Filter network 38, which is optional, may include any combination of electrical components that can be used to filter, process, or condition the output signal before providing it to battery unit 16.

Cooling unit 40, also an optional component, may use any combination of fans, water jackets, heat sinks, or any other suitable cooling means to reduce the temperature of battery charger 14 during charging. Although not shown here, battery charger 14 could have multiple power outputs including a high voltage output connected to battery unit 16 (connection 50) and a lower voltage output (not shown) connected to a 12 v battery, for example.

Battery charger sensors 42 may include any combination of hardware and/or software components capable of monitoring battery charger conditions such as charger temperature, charger input voltage (typically an AC signal), charger output voltage (typically a DC signal), charger current, etc. Depending on the particular embodiment, these sensors may be integrated within battery charger 14, they may be external sensors located outside of the battery charger, or they may be provided according to some other known arrangement. The charger temperature sensor may sense the temperature of one or more components within battery charger 14, including the temperature of the least efficient component; that is, the component of the battery charger that exhibits the most heat. Battery charger sensors 42 may be coupled directly to control unit 44, or they could be coupled to an any number of other devices, components, modules, etc., including some located outside of battery charger 14, like battery charging control module 18.

Control unit 44 may include any variety of electronic processing devices, memory devices, input/output (I/O) devices, and other known components, and may perform various control and/or communication related functions. For example, control unit 44 could receive sensor signals from the various battery charger sensors 42, package the sensor signals into an appropriate sensor message, and send the sensor message to battery charging control module 18 over a connection 52, such as a CAN bus, a system management bus (SMBus), a proprietary communication link, or any other communication means known to those skilled in the art. In another capacity, control unit 44 may receive charging control signals or other instructions from battery charging control module 18 or some other device, interpret the instructions, and execute the instructions by correspondingly controlling devices within battery charger 14. For instance, if battery charging control module 18 sends a charging control signal to battery charger 14, then control unit 44 can use the charging control signal to manipulate the pulse width modulated (PWM) duty-cycle of switching power supply 36. This, in turn, causes switching power supply 36 to alter the amount of current, and ultimately the amount of power, that is provided by battery charger 14 to battery unit 16. These are, of course, only some of the possible arrangements and functions of control unit 44, as others are certainly possible.

Battery unit 16 provides the plug-in electric vehicle with electrical power and, depending on the particular embodiment, may be the primary vehicle power source or may be used in conjunction with another power source for power supplementation purposes, to cite two examples. Many different battery types and arrangements may be used, including the exemplary one schematically shown here which includes a battery pack 60, one or more battery sensors 62, and a control unit 64. Battery pack 60 may include a collection of identical or individual battery cells connected in series, parallel, or a combination of both in order to deliver a desired voltage, amperage, capacity, power density, and/or other performance characteristics. Generally, it is desirable to provide high power and energy densities, which has led to the development and use of many types of batteries including chemical, non chemical, and others. Some examples of chemical batteries that could be used include lead acid, advanced lead acid, nickel metal hydride (NiMH), nickel cadmium (NiCd), lithium ion, zinc bromide, lithium polymer, sodium nickel chloride (NaNiCl), zinc air, vanadium redox, and others. Other chemical battery types include aluminum air, iron air, lithium iron sulfide, nickel iron, nickel zinc, silver zinc, sodium sulfur, zinc chlorine, zinc manganese, and more. According to one embodiment, battery unit 16 includes a large number of lithium ion cells, each of which exhibits between 2 v-4 v when charged and is connected in a series and/or parallel configuration with its adjacent cells. Skilled artisans will appreciate that the system and method described herein are not limited to any one particular type of battery or battery arrangement, as a number of different battery types could be employed.

Battery sensors 62 may include any combination of hardware and/or software components capable of monitoring battery conditions such as battery temperature, battery voltage, battery current, battery state of charge (SOC), battery state of health (SOH), etc. These sensors may be integrated within battery unit 16 (e.g., an intelligent or smart battery), they may be external sensors located outside of the battery unit, or they may be provided according to some other known arrangement. The battery temperature sensors may monitor and determine the battery temperature on a cell-by-cell basis, as the average or collective temperature of a block of cells or region of the battery unit, as the average or collective temperature of the entire battery unit, or according to some other temperature determining method known in the art. Measuring battery temperature on an individual cell basis may be beneficial if, for example, the middle cells exhibit different temperatures than the edge or boundary cells of battery pack 60. The same principal of determining battery temperature on a cell-by-cell, collective or other basis also applies to battery voltage, battery current, battery SOC, battery SOH, etc. Output from battery sensors 62 may be provided to control unit 64, battery charging control module 18, or some other appropriate device.

Control unit 64 may include any variety of electronic processing devices, memory devices, input/output (I/O) devices, and other known components, and may perform various control and/or communication related functions. For example, control unit 64 could receive sensor signals from the various battery sensors 62, package the sensor signals into an appropriate sensor message, and send the sensor message to battery charging control module 18 over a connection 54, such as a CAN bus, a system management bus (SMBus), a proprietary communication link, or any other communication means known to those skilled in the art. It is possible for control unit 64 to gather battery sensor readings and store them in local memory so that a comprehensive sensor message can be provided to battery charger control module 18 at a later time, or the sensor readings can be forwarded to module 18 or some other destination as soon as they arrive at control unit 64, to cite a few possibilities. In another capacity, control unit 64 can store pertinent battery characteristics and background information pertaining to the battery's cell chemistry, cell capacity, upper and lower battery voltage limits, battery current limits, battery temperature limits, temperature profiles, battery impedance, number or history of charge/discharge events, etc.

Battery charging control module 18 monitors one or more conditions pertaining to external power supply 12, battery charger 14, and/or battery unit 16, and uses the sensed conditions to control the charging process in an optimum manner. Depending on the particular embodiment, battery charging control module 18 may be a stand-alone vehicle electronic module, it may incorporated or included within another vehicle electronic module (such as a power train control module), or it may be part of a larger network or system (such as a battery management system (BMS), a vehicle energy management system, etc.), to name a few possibilities. Battery charging control module 18 may also be or part of or interact with a system that determines a desired operating mode (e.g., accelerating, braking, idling, stopping, etc.) and may implement electrical power management actions accordingly. Battery charging control module 18 may perform a number of functions pertaining to the battery charging system 10; these could include, for example, cell protection, charge control, demand management, SOC and SOH determination, cell balancing, history logging, communications, etc.

Battery charging control module 18 may include any variety of electronic processing devices, memory devices, input/output (I/O) devices, and other known components, and may perform various control and/or communication related functions. The battery charging control module can be electronically connected to other vehicle devices and modules via a suitable vehicle communications network, and can interact with them when required. In an exemplary embodiment, battery charging control module 18 includes an electronic processing device that executes instructions for software, firmware, programs, algorithms, scripts, etc. that are stored in memory devices of module 18 and govern the battery charging processes and methods described herein. Battery charging control module 18 could also store or maintain look up tables (e.g., performance response curves representing cell discharge/charge performance as a function of temperature, etc.), various sensor readings (e.g., sensor readings pertaining to battery charger conditions, battery conditions, etc.), and predetermined values used by one or more algorithms (e.g., predetermined condition values, condition calibration values, etc.), for example. These are, of course, only some of the possible functions and capabilities of battery charging control module 18, as other embodiments could also be used.

User interface 20 is an optional component that, according to the embodiment shown here, conveys battery charging information to a user, receives charging limitations and user-specified conditions from a user, and facilitates any other communication between battery charging system 10 and a user. For example, user interface 20 may display the current charge status of battery unit 16 to the driver in a numerical, graphical, or other type of electronic presentation. In another example, user interface 20 also permits a user to enter user-specified condition calibration values or other input into battery charging system 10. To illustrate, if a user intends on supplying battery charging system 10 with electricity from a particular AC wall outlet but knows that a number of other loads already exist on the same circuit, then the user could enter a current limit—for example, 10 amps. This user-specified parameter could then limit the AC current draw from external power source 12 to no more than 10 amps, even if optimum charging conditions permitted otherwise. In another example where battery charging system 10 is to be powered by a remote charging station of limited power—for example, a solar-powered remote charging station—the user could enter a power limit of 400 watts, for example. User-defined limits on current, voltage, power, or any other charging parameter could be entered via user interface 20. User interface 20 may be part of battery charging control module 18 or it can be an independent interface. Depending on the particular embodiment, user interface 20 may be mounted on the dashboard (e.g., with a driver information center (DIC)) or elsewhere, or it simply may include an electronic connection or port for connecting with a laptop or other computing device. This way, a user can provide user-specified parameters and charging commands to battery charging system 10 via a wired or wireless connection.

During an exemplary charging operation, external power source 12 provides a high voltage AC signal (e.g., 110 volts, 220 volts, etc.) to battery charger 14. Rectifier 34, which may include a full-wave rectifier or bridge, rectifies the high voltage AC signal into a high voltage rectified signal. The high voltage rectified signal is then provided to transformer 32, which steps-up the input voltage to provide a constant high voltage DC signal. The high voltage DC signal is filtered and connected to battery unit 16 via switching power supply 36, which may use pulse-width modulation (PWM) or some other technique to vary the power provided to the battery unit. For example, assume that a 110 volt AC input is rectified and stepped-up to a relatively constant 500 volt DC output. Battery charging control module 18 can control the output power supplied from battery charger 14 to battery unit 16 by providing a charging control signal to manipulate the amount of current provided at this elevated and constant voltage. One way to manipulate or control the current is to adjust the duty cycle of a PWM signal sent to switching power supply 36, although other techniques could certainly be used. It should be appreciated that battery charging system 10 is not limited to the foregoing example where the voltage is maintained relatively constant and the current is adjusted; it is also possible to control the voltage or some other aspect of the output power provided by battery charger 14.

Figure 2:
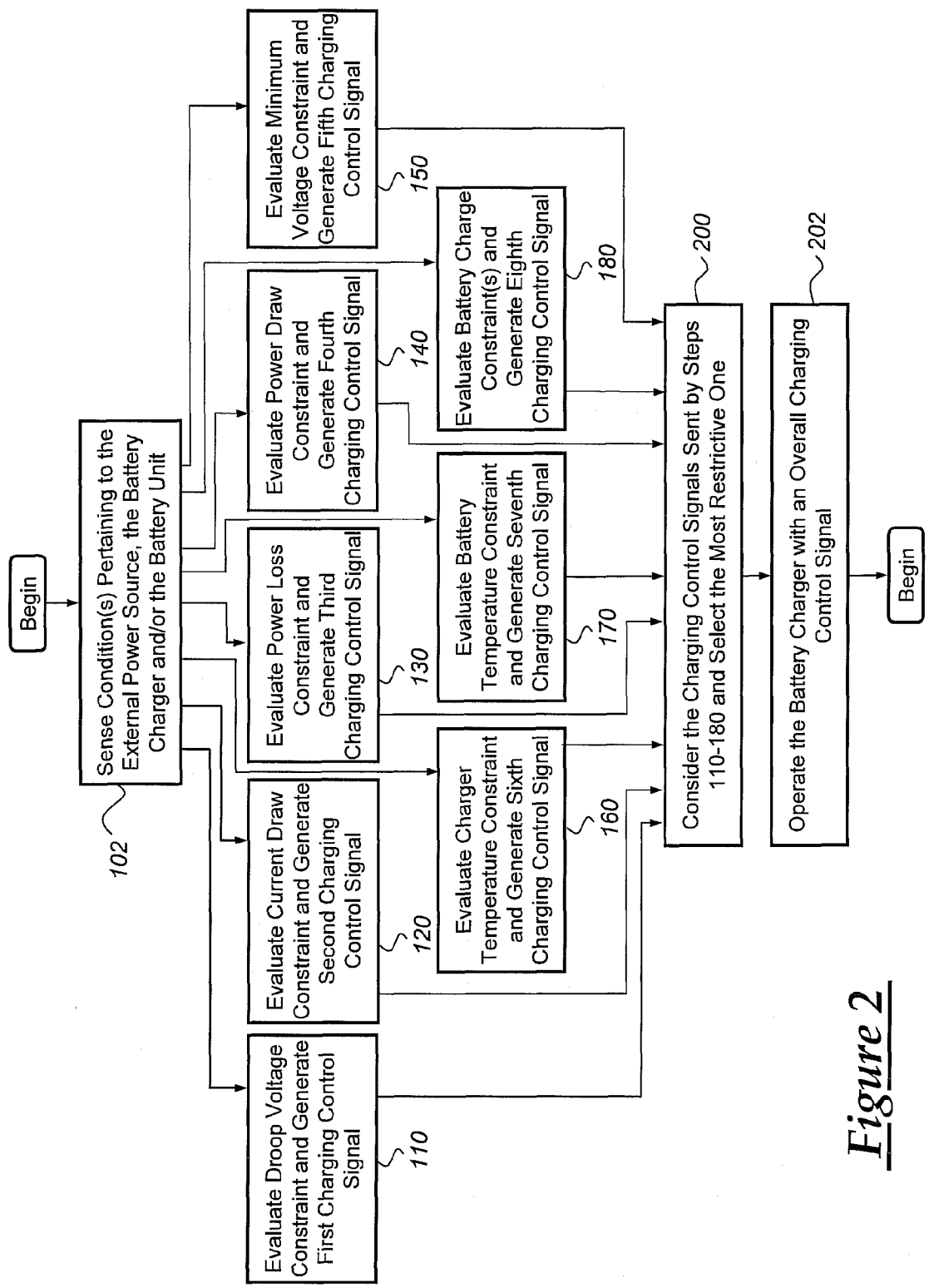
FIG. 2 is a flowchart illustrating an exemplary method for charging a vehicle battery, and may be used with the system shown in FIG. 1.

Turning to FIG. 2, there is shown an exemplary method 100 for charging a plug-in electric vehicle, such as a PHEV, where the method may use various readings, conditions, information, comparisons, calculations, etc. to charge the vehicle in an optimum fashion. An optimum charging process, which may involve charging battery unit 16 in the shortest time possible, can be affected by external conditions (e.g., the power available from external power source 12) or internal conditions (e.g., the power generation capabilities of battery charger 14, the power acceptance capabilities of battery unit 16, etc.). Thus, exemplary method 100 can monitor these and other factors in a closed-loop fashion in order to quickly charge battery unit 16, avoid damaging parts of battery charging system 10, and avoid overloading the circuit to which external power source 12 is connected. As conditions pertaining to the external power source, the battery charger, and/or the battery unit change, so too can the charging control signal which is periodically adjusted according to one or more closed-loop techniques to optimally charge the plug-in electric vehicle. 'Periodically' does not necessarily require that the charging control signal be modified according to a specific time interval, but rather includes the broad concept of continuously monitoring and making changes to the charging control signal in response to sensed conditions.

Beginning with step 102, the method senses one or more conditions pertaining to external power source 12, battery charger 14, battery unit 16, and/or any other external or internal conditions pertaining to the charging process. In an exemplary embodiment, battery charger sensors 42 sense charger temperature, charger input voltage, charger output voltage, and/or charger current; and battery unit sensors 62 sense battery temperature, battery voltage, battery current, battery SOC, and/or battery SOH. Of course, other combinations of sensor readings and conditions could also be gathered. Each sensor reading could be representative of a single sampled reading, of a number of readings averaged or filtered over time, or of readings processed according to some other signal processing or filtering technique known in the art. Once the sensor readings are obtained, they can be provided to battery charging control module 18 for further processing. It is possible for these sensor readings to be provided to battery charging control module 18 in response to a query or request from the module, or they can be provided on a periodic basis without being requested, for example. It should be appreciated that some of the battery charger conditions may actually pertain to certain aspects of external power source 12, even though they are sensed and provided by battery charger sensors 42. For instance, the charger input voltage is representative of not only the voltage seen at the input of the charger but also the unloaded voltage at external power source 12, and the charger input current is representative of both the current entering battery charger 14 and the line current provided by the external power source.

Next, the method compares or evaluates each of the sensed conditions with a specific predetermined limit and uses the output of this comparison to generate a corresponding charging control signal that is representative of that particular constraint. The various charging control signals are evaluated together, and the most restrictive constraint is used to generate the actual charging control signal that is sent from charging control module 18 to battery charger 14 and controls the charging process. This way, battery charger 14 can be pushed to charge battery unit 16 as quickly or aggressively as possible, but is still limited by the most restrictive of the various charging conditions. According to an exemplary embodiment, each of the charging control signals generated in steps 110-180 controls the amount of current provided by battery charger 14 to battery unit 16 so that step 200 can make an apples-to-apples comparison and select the most restrictive one (e.g, the one with the lowest duty cycle). Thus, the charging control signal selected in step 200 is generally representative of the most restrictive of the various conditions and constraints that were evaluated. Steps 110-180 may be performed concurrently, sequentially, or according to any other suitable monitoring arrangement, as the present method is not limited to the exemplary sequence described here.

Step 110 evaluates a droop voltage constraint and generates a corresponding first charging control signal. The droop voltage in battery charging system 10 generally represents the voltage difference of external power source 12 between an unloaded state (i.e., when little or no current is being drawn by system 10) and a loaded state. According to an exemplary embodiment, step 110 measures the charger input voltage when no current is flowing through power coupling 30 (the unloaded voltage) and measures the charger input voltage when some current is flowing therethrough (the loaded voltage), at which time both the charger input voltage and the charger input current are measured. Skilled artisans will appreciate that the unloaded charger input voltage and the external power source voltage are generally the same because there are no power losses in power coupling 30. The droop voltage may then be calculated as the difference between the unloaded and loaded voltage readings. Once the droop voltage is determined, step 110 may use this constraint with proportional-integral-derivative (PID) or other closed-loop techniques to determine a first charging control signal. Such a process is illustrated in the following example, however, other non-PID techniques could be used as well.

Assume that step 110 calculates a droop voltage of 2.5 volts and a predetermined droop voltage or setpoint of up to 4.0 volts is allowed by the system (this predetermined limit could be stored in the memory of battery charging control module 18, for example). The 2.5 volts is a calculated estimate because some portion of the measured droop voltage could be caused by factors other than battery charging system 10, such as other devices drawing current from the circuit when the unloaded voltage is determined, etc. An error is determined by subtracting the calculated droop voltage from the setpoint; in this case, 4.0 v−2.5 v=1.5 v. The 1.5 v error is then multiplied by a droop voltage calibration value or gain in order to obtain a product that can be used to generate the first charging control signal, which is representative of the constraints on the droop voltage. Persons skilled in the art will know of a number of different ways and techniques that could be used with the preceding steps, including the following: using absolute setpoints (e.g., 4.0 volts); using percentage setpoints (e.g., a voltage drop of 10%); using user-specified setpoints that can be modified; using empirically tested gains that have predictable outcomes on the condition being evaluated (e.g., for each amp of additional battery charger current, the droop voltage is expected to increase by 0.5 volts); using gains that are derived from optimum charging curves or other functions, as opposed to being a single gain value (e.g., a gain that is determined according to a complex relationship that relates droop voltage to battery charger output current); using gains that are selected from a finite number of states (e.g., if the droop voltage is less than a certain amount then the charging control signal requests a first amount of battery charger current, and if the droop voltage is greater than a certain amount then the charging control signal requests a second amount of battery charger current); and allowing for negative error values to address instances of over-shoot (e.g., if the sensed droop voltage is 4.5 volts, this produces an error value of 4.0 v−4.5 v=−0.5 v), to cite a few examples. Once the first charging control signal is determined in step 110, it is provided to a state-machine, neural network or any other logical processing device for subsequent processing in step 200, as will be explained.

It should be appreciated that the closed-loop system described above is only one possible technique and method that could be used to evaluate a droop voltage constraint and to generate a corresponding first charging control signal, as other embodiments—including both closed-loop and non-closed-loop—could also be used. Because similar processes and techniques can also be used to evaluate the various constraints in steps 120-180, duplicate discussions of closed-loop control processes for each of these constraints have been omitted. It should be appreciated that the preceding closed-loop control discussion may pertain to one or more of the following steps as well.

Step 120 evaluates a current draw constraint and generates a corresponding second charging control signal. The current draw constraint relates to the maximum amount of current that battery charging system 10 is allowed to draw from external power source 12, and it can be a predetermined limit or it can be user-specified. There are a number of reasons why method 100 may want to monitor and limit the current draw by battery charging system 10, one of which is to avoid tripping a circuit breaker of external power source 12. Consider the example where a maximum current draw limit of 15 amps (setpoint) is allowed, and the battery charger input current is measured at 10 amps. According to one embodiment, step 120 calculates an error of 5 amps, multiplies the 5 amp error by a calibration or gain value, and uses the product to derive a second charging control signal. The larger the error in current draw (i.e., the further away the actual current draw is from its upper limit), the more aggressively the second charging control signal may attempt to increase the output power of battery charger 14.

Step 130 evaluates a power loss constraint and generates a corresponding third charging control signal. The power loss constraint relates to the maximum amount of power loss that is allowed in power coupling 30. This evaluation may be helpful in cases where a power outlet is corroded, a power coupling is deteriorated, or in cases where a user selects an inappropriate electrical connection such as a thin wire extension cord, for example. Generally speaking, the power loss in power coupling 30 can be estimated by multiplying the droop voltage by the battery charger input current. Consider the example above where the droop voltage is 2.5 volts, the battery charger input current or line current is 10 amps, and the maximum amount of allowed power loss or setpoint is 40 watts. The calculated power loss is 25 watts, however, not all of the droop voltage and hence power loss may be attributable to losses in power coupling 30, as explained above. For purposes of conservatively estimating the power loss in power coupling 30, step 130 may assume that all of the calculated power loss is due to losses in the power coupling. The calculated power loss of 25 watts can be subtracted from the setpoint of 40 watts to obtain an error value of 15 watts, which in turn can be multiplied by a gain factor to produce the third charging control signal. Once the third charging control signal is determined it can be provided to step 200, as mentioned above.

Step 140 evaluates a power draw constraint and generates a corresponding fourth charging control signal. The power draw constraint relates to the maximum amount of power that is allowed to be drawn from external power source 12, and may be calculated as the unloaded charger input voltage multiplied by the charger input current. As with the current draw limit, the power draw limit or setpoint may be specified and changed by a user via user interface 20. Consider the example where a power draw of 1,100 watts is measured (110 volts*10 amps), a default maximum power draw of 1,650 watts is allowed, and the user provides a user-specified maximum power draw limit of 1,500 watts. According to one embodiment, step 140 first selects the more restrictive of the two maximum power draw limits—in this case the user-specified 1,500 watts—compares the measured amount of 1,100 watts to the 1,500 watt limit to obtain an error of 400 watts, and multiplies the error by a calibration or gain value in order to derive or otherwise determine the fourth charging control signal.

Step 150 evaluates a minimum voltage constraint and generates a corresponding fifth charging control signal. It is possible for external power source 12 to experience voltage fluctuations, including so-called brownout situations where the supply voltage drops below an ordinary and normal level. Consider the example where an unloaded voltage level of 110 volts is sensed and a minimum voltage level of 106 v is stored as a default setpoint. The calculated error is 4 volts and can be multiplied by a calibration or gain value to determine the fifth charging control signal. If the unloaded voltage approaches the minimum voltage level of 106 volts, then the fifth charging control signal can be modified to request less output power from battery charger 14. If the unloaded voltage actually falls beneath the minimum voltage level of 106 volts, then the fifth charging control signal may request that battery charger 14 supply no power to battery unit 16 until this low voltage or brownout condition abates.

Step 160 evaluates a battery charger temperature constraint and generates a corresponding sixth charging control signal. The amount of power that can be delivered by battery charger 14 to battery unit 16 may be affected or limited by the temperature of the charger. For example, if the internal temperature of battery charger 14 exceeds an upper threshold, various components of the battery charger can be damaged or destroyed (hence, the use of cooling unit 40). Moreover, the actual charging efficiency or the ability of the battery charger to generate a constant high voltage signal and control the amount of output power sent to the battery unit may be somewhat temperature dependent. In an exemplary embodiment, step 160 compares the charger temperature readings from sensors 42 to a predetermined limit or setpoint to obtain an error value, and multiplies the error value by a calibration or gain value in order to determine the sixth charging control signal. It is possible for step 160, or any of the other steps for that matter, to use a calibration or gain function (as opposed to a single gain value) that relates battery charger efficiency to battery charger temperature.

Step 170 evaluates a battery temperature constraint and generates a corresponding seventh charging control signal. The temperature of battery unit 16, whether it be the temperature of the overall battery pack 60, a region or portion of the battery pack, the temperature of an individual cell, etc., can affect the ability or efficiency of the battery unit to accept a charge. In one embodiment, step 170 compares a sensed battery temperature with one or more predetermined battery temperature limits or setpoints (there could be lower and/or upper temperature limits). An error value is obtained and multiplied by a compensation or gain value, as explained above. The product of this calculation can be used to generate the seventh charging control signal. In the event that both lower and upper temperature constraints are considered, step 170 may generate two separate charging control signals; one for the upper limit and one for the lower limit. Depending on the particular application, each of these charging control signals may request a reduction in battery charger output power as the battery temperature approaches either the upper or the lower limit.

Step 180 evaluates battery charge constraints and generates a corresponding eighth charging control signal. The battery charge constraints considered and evaluated in this step could include any conditions that pertain to the charge or charging status of the battery. For example, step 180 could compare a battery voltage reading, a battery current reading, a battery SOC reading, a battery SOH reading, or some other battery-performance reading to a predetermined limit or setpoint in order to obtain an error value. The error value could then multiplied by a compensation or gain value, as explained above, to derive the eighth charging control signal. It should be appreciated that this step is not limited to producing a single charging control signal, as separate signals could be generated for each of the constraints listed above. For instance, a charging control signal could be generated for a battery voltage constraint, a separate charging control signal could be generated for a battery current constraint, and another charging control signal could be generated for a SOC constraint. One or more of these charging control signals, such as the ones relating to the SOC and the SOH constraints, could include cutoffs if the SOC or other condition exceeds a certain amount.

It should be appreciated that any combination of constraints and charging control signals could be evaluated and generated, and that the present method is not limited to the exemplary combination provided above. Moreover, any of the constraints and charging control signals discussed above could utilize user-specified limitations or setpoints. For example, a user may establish or adjust the maximum current draw allowed in step 120 or the maximum power draw allowed in step 140. If a user knows that a particular AC outlet in the garage is part of a widely used circuit, then they may want to lower the current draw limit from 15 amps to 10 amps to avoid tripping the corresponding circuit breaker. The user could provide this information via user interface 20. Conversely, if an AC outlet in the garage has been specifically wired on its own dedicated 20 amp circuit, then the user could increase the maximum allowed power draw to 2,200 watts, for example. Such an increase could result in a quicker charge, assuming that it does not run afoul of any of the other constraints discussed herein.

Once the various constraints have been evaluated and corresponding charging control signals have been generated, step 200 considers the signals and produces an overall charging control signal to send to battery charger 14 for controlling the charging process. According to an exemplary embodiment, step 200 examines the various signals sent in steps 110-180, selects the charging control signal that represents the most restrictive constraint (e.g., the signal with the smallest duty cycle or the signal that otherwise requests the least amount of output power by the battery charger), and sends the overall or selected charging control signal from battery charging control module 18 to battery charger 14. Skilled artisans will know of a variety of tools and techniques that could be used to perform step 200, including the use of a state-machine, neural network or any other logical processing device or network. It is not necessary that all of the charging control signals from steps 110-180, which are actually charge request signals, be sent in the form a PWM current-controlling signal. Rather, they could be in various forms and could be translated or interpreted at step 200, they could be non-PWM current-controlling signals, or they could control other aspects of the battery charger power output other than current, to provide a few possibilities.

In step 202, battery charger 14 is operated according to the overall charging control signal that was previously sent. As already mentioned, the overall battery charging control signal could be used to manipulate the amount of current provided by battery charger 14 to battery unit 16 by means of PWM or some other control technique. This way, method 100 may charge the plug-in vehicle in an aggressive manner that aims to reduce the charging time, yet do so in a way that balances a number of parallel constraints driven by one or more internal and/or external conditions. Method 100 could then be repeated until step 180 sends a state of charge (SOC) control signal indicating that battery unit 16 has reached a charging or other limit.

The charging method described herein may be particularly useful in less than ideal charging conditions; that is, when the power provided by external power source 12 is unstable or inconsistent, when power coupling 30 is experiencing some type of operational issues, or when some other condition—either internal or external to the system—presents challenges to the charging process. Moreover, battery charging system 10 may be used with a variety of different vehicles and is not limited to any one vehicle make and model. Such flexibility could reduce the cost of the system, as a new battery charger would not need to be individually developed for each vehicle; rather, engineers could simply alter the various setpoint values, calibration or gain values, other software settings, etc.

In addition to the different steps and techniques described above, one or more of the following optional features could also be employed by exemplary method 100. In addition to the constraints of steps 110-180, method 100 could watch for a variety of different fault conditions, where if any one of these fault conditions or 'hard limits' is detected, the method stops the charging process and notifies the user, vehicle, etc. of the situation. One way to perform such notification is through the use of a diagnostic trouble code (DTC), which could be used with a fault condition or during the normal charging process. For example, if step 130 detects a high power loss that is likely attributable to a bad power coupling, then a corresponding DTC could be generated that provides information on the problem. It is also possible for method 100 to periodically sample the unloaded voltage of external power source 12 and to update any calculations, such as droop voltage, with the new readings. For example, method 100 could stop the charging process every so often, say every 10 minutes, and wait for 100 ms or so to take a new unloaded voltage reading. It is also possible for one or more of the steps in method 100 to employ a hysteresis factor when determining their requested charging control signals. If battery charger 14 is also used to supply other power sources, such as low voltage batteries, etc., then method 100 could take that additional power draw into account when determining the optimum power output of battery charger 14.

It should be appreciated that a variety of different battery charger types, schemes and charging techniques could be used with method 100 and/or system 10, including: constant voltage charging, semi-constant voltage charging, constant current charging, semi-constant current charging, constant current/constant voltage charging, taper current charging, pulsed charging, burp charging (i.e., reflex or negative pulse charging), IUI charging, trickle charging, float charging, random charging, slow charging (e.g., 14-16 hours), quick charging (3-6 hours), fast charging (1 hour or less), timer controlled charging, intelligent charging, switcher charger types (e.g., switch mode regulator), linear charger types (e.g., series regulator), shunt, buck and inductive charger types, etc. In addition, battery charger 14 may be designed for specific cell chemistries or for universal cell applicability, and it may be self-programmable or user-programmable, to name a few possibilities.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for charging a plug-in electric vehicle, comprising the steps of:
    (a) sensing at least one condition pertaining to an external power source, a battery charger located on the plug-in electric vehicle, or a battery unit located on the plug-in electric vehicle, wherein the sensed condition is at least partially based on an unloaded voltage of the external power source which is measured when the external power source is in an unloaded state and there is little or no current being drawn from the external power source by the battery charger located on the plug-in electric vehicle;
    (b) determining a charging control signal based on the sensed condition that is at least partially based on an unloaded voltage of the external power source; and
    (c) charging the battery unit with the battery charger, wherein the battery charger is operated according to the charging control signal and the charging control signal is periodically adjusted in response to changes in the sensed condition.

2. The method of claim 1, wherein step (a) further comprises sensing at least one condition that pertains to the external power source and is selected from the group consisting of: droop voltage in the external power source, current draw from the external power source, power loss in a power coupling, power draw from the external power source, or minimum voltage of the external power source.

3. The method of claim 1, wherein step (a) further comprises sensing at least one condition that pertains to the battery charger and is selected from the group consisting of: charger temperature, charger voltage, or charger current.

4. The method of claim 1, wherein step (a) further comprises sensing at least one condition that pertains to the battery unit and is selected from the group consisting of: battery temperature, battery voltage, battery current, battery state of charge (SOC), or battery state of health (SOH).

5. The method of claim 1, wherein step (b) further comprises determining the charging control signal by using closed-loop control to: i) compare the sensed condition to a setpoint to obtain an error value, ii) multiply the error value by a gain value to obtain a product, and iii) use the product to obtain the charging control signal.

6. The method of claim 5, wherein step (b)(i) allows a user-specified setpoint in order to enable the user to control one or more constraints on the charging process.

7. The method of claim 6, wherein the user-specified setpoint pertains to the maximum amount of current that can be drawn from the external power source.

8. The method of claim 6, wherein the user-specified setpoint pertains to the maximum amount of power that can be drawn from the external power source.

9. The method of claim 5, wherein step (b)(i) allows a negative error value in order to address overshoot by the method.

10. The method of claim 5, wherein step (b) uses proportional-integral-derivative (PID) control to obtain the charging control signal.

11. The method of claim 1, wherein step (c) further comprises operating the battery charger according to the charging control signal, and the charging control signal uses pulse width modulation (PWM) to vary the amount of current that is provided by the battery charger to the battery unit.

12. The method of claim 1, further comprising the step of: evaluating one or more fault conditions and if a fault condition is detected, then stopping the charging process.

13. The method of claim 1, further comprising the step of: generating a diagnostic trouble code (DTC) that provides information regarding the sensed condition.

14. The method of claim 1, further comprising the steps of: putting the external power source in an unloaded state where there is little or no current being drawn from the external power source by the battery charger; and
    periodically sampling the unloaded voltage of the external power source and using the unloaded voltage of the external power source to make at least one calculation selected from the group consisting of: droop voltage in the external power source, power loss in a power coupling, power draw from the external power source, or minimum voltage of the external power source.

15. The method of claim 1, wherein step (a) further comprises sensing a plurality of conditions pertaining to the external power source, the battery charger, or the battery unit, step (b) further comprises evaluating the plurality of sensed conditions, determining corresponding constraints for each of the plurality of sensed conditions, and determining the charging control signal based on the most restrictive of the plurality of constraints, and step (c) further comprises operating the battery charger according to the charging control signal which is representative of the most restrictive constraint, wherein at least one of the plurality of conditions is at least partially based on an unloaded battery charger input voltage.

16. The method of claim 1, wherein the plug-in electric vehicle is a plug-in hybrid electric vehicle (PHEV) and the external power source is an alternating current (AC) wall outlet.

17. A method for charging a plug-in electric vehicle, comprising the steps of:
    (a) sensing a plurality of conditions pertaining to an external power source, a battery charger, and/or a battery unit, wherein at least one of the plurality of conditions is a droop voltage that generally represents the difference between an unloaded voltage of the external power source and a loaded voltage of the external power source, wherein the unloaded voltage is measured when the external power source is in an unloaded state and there is little or no current being drawn from the external power source by the battery charger, and the loaded voltage is measured when the external power source is in a loaded state and there is some current being drawn from the external power source by the battery charger;
    (b) evaluating each of the sensed conditions with a particular battery charging constraint;
    (c) reviewing each of the evaluations and identifying the most-restrictive constraint, wherein the most-restrictive constraint is the one that requests the least amount of current from the battery charger; and
    (d) operating the battery charger so that it does not violate the most-restrictive constraint.

18. A system for charging a plug-in electric vehicle, comprising:
    a battery charger being located on the plug-in electric vehicle and having an input coupled to an external power source, an output coupled to a battery unit, and one or more sensor(s) for monitoring external power source conditions and/or battery charger conditions;
    a battery unit being located on the plug-in electric vehicle and having an input coupled to the battery charger and one or sensor(s) for monitoring battery conditions; and a battery charging control module being located on the plug-in electric vehicle and being coupled to both the battery charger and the battery unit, wherein the battery charging control module receives readings from the battery charger sensor(s) and the battery sensor(s) and uses those readings to control the output power that the battery charger provides the battery unit, and one of the readings that is used in the control of the output power is an unloaded voltage reading for the external power source which is representative of the external power source when it is in an unloaded state and there is little or no current being drawn from the external power source by the battery charger.

* * * * *